Oct. 15, 1968     G. FAUSER     3,406,200
UREA MANUFACTURE
Filed Dec. 28, 1960
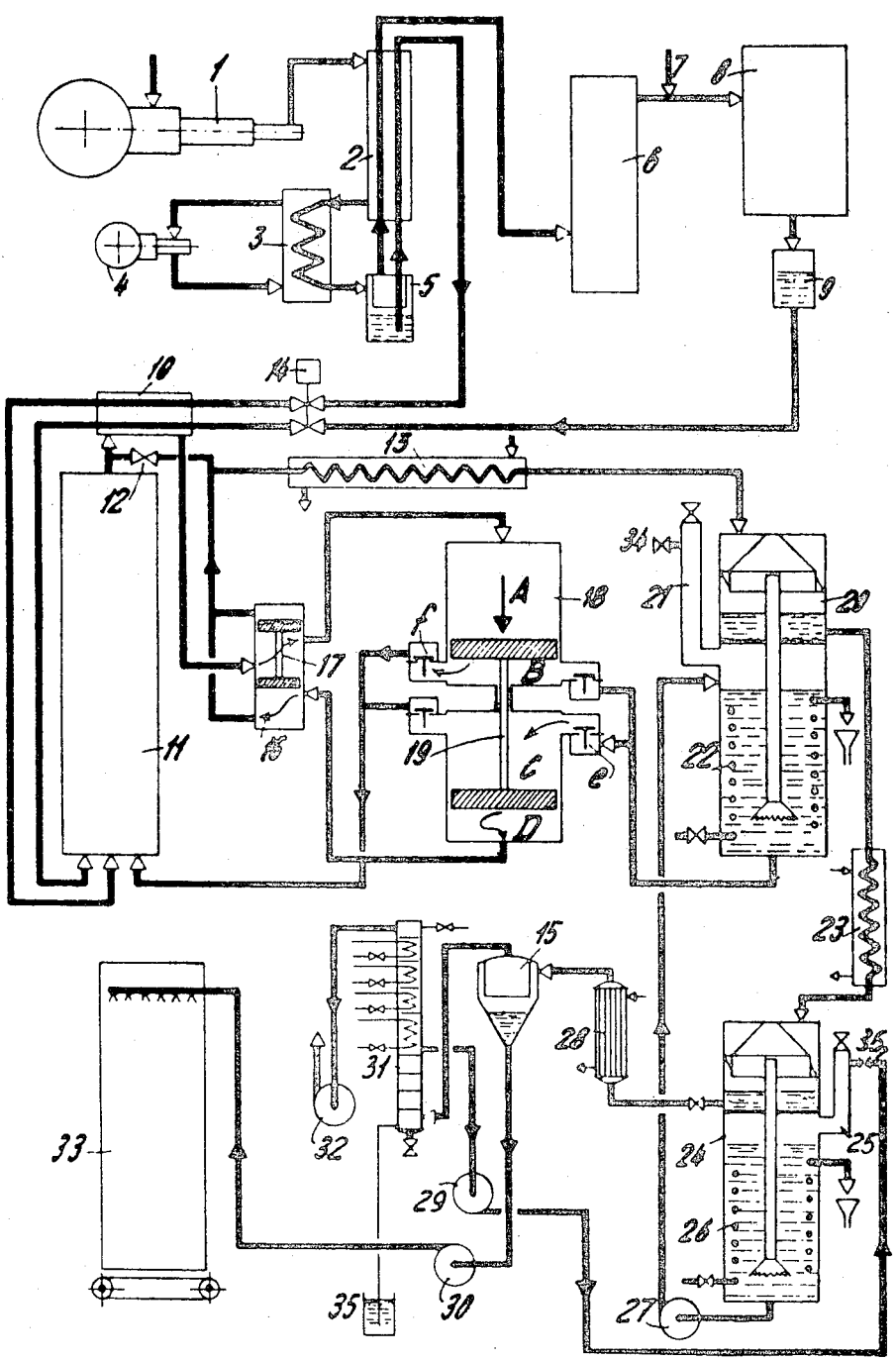

United States Patent Office 3,406,200
Patented Oct. 15, 1968

3,406,200
UREA MANUFACTURE
Giacomo Fauser, Novara, Italy, assignor to Montecatini Edison S.p.A., Milan, Italy
Filed Dec. 28, 1960, Ser. No. 78,896
Claims priority, application Italy, Dec. 31, 1959, 21,734/59
13 Claims. (Cl. 260—555)

This invention relates to industrial processes for the synthesis of urea by reaction between carbon dioxide and ammonia. It is known that this reaction is favored by increasing the temperature and pressure. For example, when the two reactants, in stoichiometric proportions, are subjected to a pressure of 200 atmospheres at 180° C., only 45% is converted to urea, the remainder being carbamate. In contrast, upon raising the temperature to 210° C. and pressure to 270 atm., a conversion of over 50% is obtainable.

The advantages deriving form increasing the pressure are, however, offset by the higher energy consumption expended in compressing the reactants, especially that required to pump the unreacted carbamate back into the autoclave.

The present invention results in a very great saving in the energy consumed in producing urea, as compared with the methods used to date.

The ammonia required for the synthesis of urea is generally synthesized by reacting hydrogen and nitrogen. The hydrogen required for this, and the carbon dioxide needed for reacting with ammonia to produce urea, are generally obtained, in admixture, by partial combustion of hydrocarbons. The carbon dioxide is separated from the hydrogen produced from liquid or gaseous hydrocarbons by adsorption in water under pressure or in alkaline solutions. The former method requires an energy consumption of about 300 kwh. per ton of carbon dioxide, and also involves appreciable loss of hydrogen. In the latter method the energy consumption is reduced to 40 kwh./m$^3$., but about 1 ton of steam per ton of $CO_2$ is needed to regenerate the alkaline solution.

In both processes, the carbon dioxide must subsequently be compressed to the pressure required for the urea synthesis.

Instead, according to the present invention, the carbon dioxide destined for the production of urea is separated from the hydrogen by cooling to a low temperature at a pressure of 300 atms., at which pressure the ammonia synthesis is carried out. Then the carbon dioxide is conveyed, together with the liquid ammonia, without any further energy consumption, to a reactor for the production of urea, operating at a pressure but little lower than 300 atm.

The accompanying drawing diagrammatically illustrates the process.

From the partial combustion of a fuel oil with oxygen, after the CO conversion, a gas containing about ⅔ hydrogen and ⅓ $CO_2$ is obtained. This gas is compressed by compressor 1 to 300 atm. and, after passing through the heat exchanger 2, is cooled in cooler 3 to −50° C. in a refrigerating engine 4. About 80% of the carbon dioxide present in the gas is separated as a liquid in the reservoir 5. The hydrogen is subsequently completely freed of $CO_2$ and CO in purifier plant 6 and, after addition of nitrogen coming from 7, is introduced into the ammonia synthesis circuit 8.

The carbon dioxide separated by said cooling is generally sufficient to convert all the ammonia produced into urea. Due to heat recovery in the exchanger 2, the energy required to condense or liquefy the carbon dioxide is reduced to only about ¹⁄₁₀ of the amount that would be needed to eliminate it if the conventional washing with water under pressure were employed.

The carbon dioxide and liquid ammonia are conveyed from reservoirs 5 and 9, respectively, in the proportions needed for the urea synthesis. This is accomplished by means of the automatic flow governor 14. The reactants pass first to the heat exchanger 10 and then, under a pressure of 270 atm., to the autoclave 11, in which the urea is formed.

Since the reaction in the autoclave 11 is not quantitative, it is necessary to separate the urea from the carbamate in the apparatus 20 and to recycle the carbamate into the autoclave.

Heretofore, the discharge of carbamate and urea solution from the autoclave was wastefully carried out through valves which dissipated the energy of the liquid leaving at high pressure and at high temperature. Besides the waste of energy, such valves necessarily suffer rapid wear. In contrast, in the present invention the energy of the solution leaving the autoclave is employed to compress the carbamate again into the autoclave. The device employed for this is a pair of coaxial piston cylinders 18. The pistons in the cylinders are rigidly connected to each other by rod 19. Their function is explained below.

The urea and carbamate solution leaving the autoclave 11 is passed through the heat exchanger 10, to lower the solution temperature from 210° C. to 140° C., while preheating the ammonia and the carbon dioxide prior to their introduction into the autoclave 11. Thus, the chemical corrosion of the apparatus is avoided, due to reduction in the chemical aggressiveness of the cooled urea.

It will readily be understood that the terms "urea and carbamate solution" could not exclude the presence of products of partial hydrolysis of both the urea and the carbamate, namely carbon dioxide and ammonia. Such hydrolysis is commonly known, and is mentioned in elementary texts on organic chemistry.

The solution discharged from autoclave 11 through heat exchanger 10 is passed to distributor 16 which alternately forwards it to the outer ends of the cylinder chambers A and D. The opposite faces B and C act like a common hydraulic pump, alternately sucking the carbamate from a condenser 22, through the valves e and f, and compressing it into the autoclave 11.

The arrows of the drawing show the circulation of the liquid during the movement of the pistons in cylinders 18 from the top to the bottom. The force acting at A on the piston is greater than that acting at B because the cross section of rod 19 reduces the effective area of the piston face at 13. The difference provides the thrust necessary for the operation of the device.

At the end of the stroke, the double piston 17 of distributor 16 reverses the direction of circulation of the liquid. Since the volume of the urea and carbamate solution leaving the autoclave 11 is much greater than the volume of the carbamate injected into it by pump 18, it is necessary to discharge the difference between the two volumes into the circuit at a point after pump 18. Said difference is passed, through valve 12, into an exit conduit leading from distributor 16 to an evaporator 13.

The separation of the carbamate from the urea, and its total recycling to the autoclave, is carried out in two steps. About 75% of the carbamate is first separated in the apparatus 20, the remaining 25% being subsequently separated in apparatus 24.

The solution that was previously passed into chamber D now is forced into the distributor 16, which it leaves under a pressure of 15 to 30 atm. It is forwarded, after rapid heating in evaporator 13, to the separator 20, where the evaporated carbamate is condensed in the lower section 22, at a temperature of from 80° to 100° C., to prevent the crystallizing of the salt.

The exit gases, comprising inert gases originally contained in the ammonia and carbon dioxide, are washed in a small tower 21 with a small amount of water introduced through pipe 34, to recover the carbamate vapors.

The urea solution leaving the separator 20 is subjected to a treatment analogous to the preceding one, but at a pressure of from 0.5 to 1.5 atm., in the distilling apparatus 23, and in the apparatus 24.

The carbamate solution is sent by pump 27 to the condenser 22 and from there it is introduced into the autoclave 11, with energy recovery by means of the pump 18. The urea solution is concentrated under vacuum, up to 99%, in the distilling apparatus 28, and is then forwarded by pump 30 to a granulation tower 33. Since the urea solution contains a few grams of ammonia per liter, the vapor leaving the separator 15 is subjected to fractional condensation in the column 31, to recover the ammonia as a concentrated solution. Said ammonia solution is then recycled by pump 29 into the condenser 24, thus resulting in a conversion yield of ammonia into urea that is very close to 100%.

I claim:

1. A process for producing urea from nitrogen and a mixture of carbon dioxide and hydrogen, comprising compressing a mixture of carbon dioxide and hydrogen and cooling the compressed mixture to condense the carbon dioxide and separate it from the hydrogen, reacting the separated compressed hydrogen with nitrogen to produce liquid ammonia, reacting the separated carbon dioxide with said liquid ammonia under pressure to synthesize urea, the said carbon dioxide and the ammonia being passed to the urea synthesis without further expenditure of energy for compression.

2. A process for producing urea from nitrogen and a mixture of carbon dioxide and hydrogen, comprising compressing a mixture of carbon dioxide and hydrogen and cooling it to condense the carbon dioxide and separate it from the hydrogen, reacting the separated hydrogen with nitrogen under pressure to produce ammonia, reacting the separated carbon dioxide with said ammonia under pressure to synthesize urea, the said carbon dioxide and the ammonia being passed to the urea synthesis without further expenditure of energy for compression, the pressure employed in the condensing of the carbon dioxide being substantially the same as the pressure in the ammonia synthesis.

3. A process for producing urea from nitrogen and a mixture of carbon dioxide and hydrogen, comprising compressing a mixture of carbon dioxide and hydrogen to a pressure above 100 atmospheres and cooling it to condense the carbon dioxide and separate the latter from the hydrogen, reacting the separated compressed hydrogen with nitrogen at a pressure above 100 atmospheres to produce liquid ammonia, and reacting the separated carbon dioxide with said liquid ammonia under pressure to synthesize urea.

4. A process of synthesizing urea, comprising reacting carbon dioxide and ammonia under pressure, to produce a mixture of urea and carbamate, removing said mixture alternately to an expansion zone and a compression zone, releasing the pressure on the removed mixture in said expansion zone, applying the released energy of compression to said compression zone to force said mixture to a zone in which carbamate is separated from said urea.

5. A process for producing urea from nitrogen and a mixture of carbon dioxide and hydrogen, comprising compressing a mixture of carbon dioxide and hydrogen and cooling it to condense the carbon dioxide and separate it from the hydrogen, reacting the separated hydrogen with nitrogen under pressure to produce ammonia, reacting the separated carbon dioxide with said ammonia under pressure to synthesize urea, the said carbon dioxide and the ammonia being passed to the urea synthesis without further expenditure of energy for compression, the pressure employed in the condensing of the carbon dioxide being substantially the same as the pressure in the ammonia synthesis, a urea and carbamate reaction mixture under pressure being produced in the urea synthesis, removing the urea and carbamate reaction mixture, passing it into an expansion chamber to release the pressure on said removed mixture, and alternately into a compression chamber, and employing the released energy of expansion to apply pressure in said compression chamber and to expel the mixture from the latter and send it through a separating zone in which the carbamate is separated from the urea, and further employing the released energy of expansion to suck separated carbamate solution from the separating zone and to force it back into the urea synthesis.

6. A process of synthesizing urea, comprising reacting carbon dioxide with ammonia under pressure, a urea and carbamate reaction mixture under pressure being produced in the urea synthesis, removing the urea and carbamate reaction mixture, passing it into an expansion chamber to release the pressure on said removed mixture, and alternately into a compression chamber, and employing the released energy of expansion to apply pressure in said compression chamber and to expel the mixture from the latter and send it through a separating zone in which the carbamate is separated from the urea, and further employing the released energy of expansion to suck separated carbamate solution from the separating zone and to force it back into the urea synthesis.

7. In a process for producing urea by reacting ammonia and carbon dioxide under pressure above 100 atmospheres, a urea and ammonium carbamate solution being produced, passing the solution into an expansion chamber to release pressure thereon, to a pressure of about 15 to 30 atmospheres, heating the solution to evaporate the ammonium carbamate, separating urea solution, condensing the ammonium carbamate vapor to a liquid, at from about 80° to 100° C., employing the energy of said expansion to apply energy to force the ammonium carbamate condensate liquid back into the urea synthesis, heating the urea solution at a pressure not higher than about 1.5 atmospheres to evaporate residual ammonium carbamate, separating urea, condensing the ammonium carbamate to a liquid, at from about 80° to 100° C., the latter liquid also being forced back into the urea synthesis as aforesaid.

8. The process of claim 7, combining the urea solutions, concentrating by distillation, separating the vapor from the concentrated urea solution, and subjecting the vapor to fractional condensation to recover ammonia.

9. In a process for producing urea by reacting ammonia and carbon dioxide under pressure above 100 atmospheres, a urea and ammonium carbamate solution being produced, passing the solution into an expansion chamber to release pressure thereon, to a pressure of about 15 to 30 atmospheres, heating the solution to evaporate the ammonium carbamate, separating urea solution, condensing the ammonium carbamate vapor to a liquid, at from about 80° to 100° C., employing the energy of said expansion to apply energy to force the ammonium carbamate condensate liquid back into the urea synthesis.

10. In a process for producing urea by reacting ammonia and carbon dioxide under pressure above 100 atmospheres, a urea and ammonium carbamate solution being produced, passing the solution into an expansion chamber to release pressure thereon, to a pressure of about 15 to 30 atmospheres, heating the solution to evaporate the ammonium carbamate, separating urea solution, condensing the ammonium carbamate vapor to a liquid, employing the energy of said expansion to apply energy to force the ammonium carbamate condensate liquid back into the urea synthesis.

11. A process for producing urea from nitrogen and a mixture of carbon dioxide and hydrogen, comprising compressing a mixture of carbon dioxide and hydrogen and cooling the compressed mixture to condense the carbon dioxide and separate it from the hydrogen, reacting the separated compressed hydrogen with nitrogen to produce liquid ammonia, reacting the separated carbon dioxide with said liquid ammonia under pressure to synthesize urea, at a pressure above 100 atmospheres, a urea and ammonium carbamate solution being produced, passing the solution into an expansion chamber to release pressure thereon, to a pressure of about 15 to 30 atmospheres, heating the solution to evaporate the ammonium carbamate, separating urea solution, condensing the ammonium carbamate vapor to a liquid, at from about 80° to 100° C., employing the energy of said expansion to apply energy to force the ammonium carbamate condensate liquid back into the urea synthesis, heating the urea solution at a pressure not higher than about 1.5 atmospheres to evaporate residual ammonium carbamate, separating urea, condensing the ammonium carbamate to a liquid, at from about 80° to 100° C., the latter liquid also being forced back into the urea synthesis as aforesaid.

12. A process for producing urea from nitrogen and a mixture of carbon dioxide and hydrogen, comprising compressing a mixture of carbon dioxide and hydrogen and cooling the compressed mixture to condense the carbon dioxide and separate it from the hydrogen, reacting the separated compressed hydrogen with nitrogen to produce liquid ammonia, reacting the separated carbon dioxide with said liquid ammonia under pressure to synthesize urea at a pressure above 100 atmospheres, a urea and ammonium carbamate solution being produced, passing the solution into an expansion chamber to release pressure thereon, to a pressure of about 15 to 30 atmospheres, heating the solution to evaporate the ammonium carbamate, separating urea solution, condensing the ammonium carbamate vapor to a liquid, at from about 80° to 100° C., employing the energy of said expansion to apply energy to force the ammonium carbamate condensate liquid back into the urea synthesis.

13. A process of synthesizing urea, comprising reacting carbon dioxide and ammonia under pressure, to produce a urea and ammonium carbamate containing mixture, releasing pressure on the mixture so as to separate ammonium carbamate as vapor from urea, condensing the ammonium carbamate vapor to a liquid, employing the energy of said pressure release to apply energy to force the ammonium carbamate condensate liquid back into the urea synthesis, heating the separated urea solution under pressure to evaporate residual ammonium carbamate, separating urea, condensing the ammonium carbamate to a liquid, the latter liquid also being forced back into the urea synthesis by employing the energy of expansion as aforesaid.

References Cited

UNITED STATES PATENTS

| | | | |
|---|---|---|---|
| 1,670,341 | 5/1928 | Casole | 260—555 |
| 2,848,493 | 8/1958 | Dewling | 260—555 |
| 2,929,690 | 3/1960 | Bennett et al. | 23—263 |
| 2,908,556 | 10/1959 | Watson et al. | 23—263 |
| 2,632,316 | 3/1953 | Eastman | 62—10 |
| 2,842,941 | 7/1958 | Eickmeyer et al. | 62—10 |
| 2,913,493 | 11/1959 | Sze et al. | 260—555 |
| 1,730,208 | 10/1929 | Hetherington et al. | 260—555 |

FOREIGN PATENTS 145,060   5/1921   Great Britain.

OTHER REFERENCES

Harding, Ammonia-Manufacture and Uses (Oxford University Press, 1959) pp. 1, 2, 21 and 22, TP 223 H37.

Perry, Chemical Engineer's Handbook (2nd ed., 1941), pp. 2252–55 TP 155, p. 4.

R. H. JILES, *Primary Examiner.*